May 21, 1935.  C. L. McMASTER  2,002,121

HOSE COUPLING

Filed Nov. 25, 1933

INVENTOR
CARLOS L. McMASTER
BY
Birckett, Hyde, Higley & Meyer
ATTORNEYS

Patented May 21, 1935

2,002,121

UNITED STATES PATENT OFFICE 2,002,121

HOSE COUPLING

Carlos L. McMaster, Cleveland Heights, Ohio

Application November 25, 1933, Serial No. 699,723

4 Claims. (Cl. 29—148.5)

This invention relates to improvements in hose couplings and in methods of making such couplings.

One of the objects of the present invention is the provision of an improved hose coupling comprising a minimum number of simple and inexpensively constructed parts capable of being readily and securely assembled with an end of a hose.

More particularly, the hose coupling of the present application comprises a simple, one-piece coupling member adapted to have an end of a hose assembled therewith, a simple one-piece sleeve member adapted for cooperation with said coupling member, and a simple one-piece hose gripping member enclosed and carried by said sleeve member for maintaining said hose end in assembly with said coupling member.

Another object of the present invention is the provision of an improved method of making the present hose coupling, thereby enabling production costs therefor to be materially lowered and the price of said coupling to be correspondingly reduced.

More particularly, the present improved method includes the steps of casting the coupling member and the hose gripping member of the present coupling in one piece, of utilizing the coupling member part of said casting as a means for supporting the gripping member part thereof during machining of the same and thereafter, of separating said parts.

Further objects of the invention are in part obvious and in part will appear more in detail hereinafter.

Figure 1:
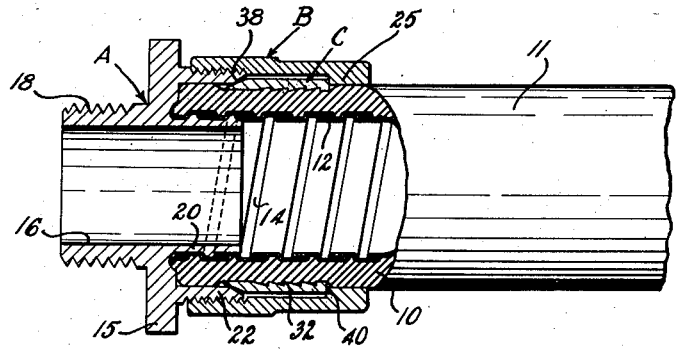
Figure 2:
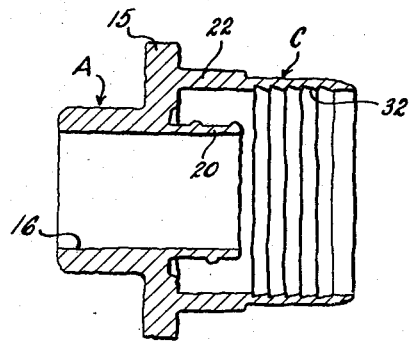
Figure 3:
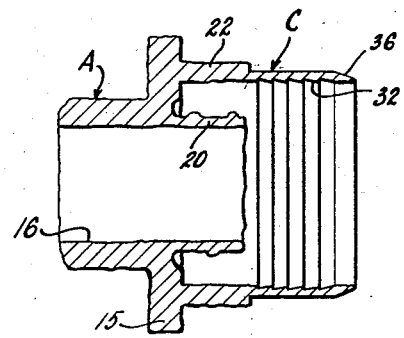
Figure 4:
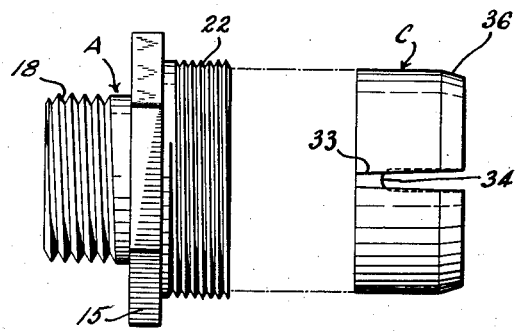

The present invention will be readily understood from the following description thereof, reference being had to the accompanying drawing in which Fig. 1 is a side elevation of the present improved coupling in assembly with an end of a hose, parts of said coupling and said hose being broken away and in section for clearness of illustration; Fig. 2 is a longitudinal sectional view of the coupling member and the hose gripping member of the present coupling as they appear in the form of a one-piece rough casting; Fig. 3 is a similar view but showing the gripping member part of said casting after it has been machined; and Fig. 4 is a side elevation of said coupling member and said gripping member, in finished form and in separated relation.

Although the present improved coupling is suitable for use with various forms of hose, it is especially suitable for use with flexible, metal lined hose, such as is used for the delivery of gasoline and the like.

The hose here shown is of well known form, having a rubber body portion 10, a fabric cover 11 and a metal lining 12, said lining being in the form of a helically wound strip of metal having its successive coils interlocked and forming a helical or screw-like groove 14.

The present improved hose coupling comprises three simple, one-piece metal members, namely, a coupling member A, a cooperating sleeve member B and a hose gripping member C, said latter member being carried by said sleeve member and being adapted to maintain a hose end in assembly with said coupling member.

The coupling member A includes a relatively flat, nut-like portion 15 by means of which said member may be readily turned, said portion being provided with a centrally disposed opening 16 corresponding in size and shape with the bore of said hose. On one side of said nut-like portion, in alignment with the opening 16 thereof, is an externally threaded nipple 18, by means of which the coupling member may be readily secured to any desired fitting or the like, and on the other side of said nut-like portion, also in alignment with the opening 16 thereof, is a tubular portion 20, of a size to snugly receive an end of said hose. To afford a more permanent assembly of said hose and said tubular portion 20, said portion is externally threaded, the threads of which cooperate with the thread-like groove 14 of the hose lining 12. On the same side as said hose-receiving tubular portion 20, the nut-like portion 15 of said coupling member is provided with an externally threaded sleeve member receiving portion 22, which portion is also of tubular form but of enlarged cross-sectional size, so that an annular chamber is provided between said hose-receiving portion 20 and said sleeve member connecting portion 22 for snugly receiving said hose end, all as clearly shown in Fig. 1.

The sleeve member B is a simple tubular member, internally threaded at one end for securement to the externally threaded, enlarged tubular portion 22 of the coupling member and provided at its other end with an inwardly extending, annular flange 25 engaging said hose.

The hose gripping member C is a simple split ring member, provided on its inner surface with annular, hose gripping teeth or corrugations 32. If desired and as shown, said gripping member may be provided, in opposed relation to the through slot 33 thereof, with a partial, transversely disposed slot 34, to thereby enable said member to more freely expand and contract, all as will be readily understood.

That end of said gripping member which constitutes the front end thereof is provided with an external, inwardly tapered portion 36 for cooperation with an internal, correspondingly tapered portion 38 at the rear end of the enlarged tubular portion 22 of the coupling member A. The effect of said tapered portions is to produce inward, hose-gripping movement of the forward end of said gripping member upon longitudinal movement thereof into engagement with said coupling member, which longitudinal movement is effected by the sleeve member B. The inwardly extending annular flange 25 of said sleeve member provides an internal annular shoulder 40 which constitutes the rear abutment for said gripping member when said member is located within said sleeve member, as it is in use of the device.

To reduce the costs of producing the hose gripping member C of the present improved coupling, said member and the coupling member A are formed as a one-piece casting, as shown in Fig. 2. The coupling member part of said casting therefore serves as a convenient means of supporting the gripping member part of said casting during machining thereof, both internally and externally, a method which is of great commercial importance, inasmuch as it enables the present coupling to be made and sold at much lower cost.

After the hose gripping part of said casting has been properly machined, as shown in Fig. 3, said casting is separated into its two parts, one part being the hose gripping member C and the other part being the coupling member A. Either before or after such separation, the coupling member is finished, as shown in Fig. 4, and the hose gripping member provided with its transversely disposed slots 33, 34, all as will be readily understood.

Further features of the present invention will be apparent to those skilled in the art to which it relates.

What I claim is:

1. In the method of making a hose coupling having a coupling member and a hose gripping member, the step of making said members in one piece with said members directly connected to each other end to end, and the subsequent step of separating said members.

2. In the method of making a hose coupling having a coupling member and a hose gripping member, the step of making said members in one piece, the subsequent step of finishing the surfaces of said gripping member while said member is connected to and supported by said coupling member, and the subsequent step of separating said members.

3. In the method of making a hose coupling having a coupling member and a transversely slotted hose gripping member, the step of making said members in one piece with said members directly connected to each other, the step of finishing the surfaces of said gripping member while said member is connected to and directly supported by said coupling member, the subsequent step of separating said members, and the subsequent step of transversely slotting the gripping member.

4. In the method of making a hose coupling having a generally tubular coupling member and a generally tubular hose gripping member, the latter member having a beveled end, the step of making said members in one generally tubular piece with the beveled end of said gripping member a free end thereof, the subsequent step of finishing the surfaces of that portion of said generally tubular piece which constitutes said gripping member and while said generally tubular piece is being supported by that portion of it which constitutes said coupling, and the subsequent step of separating said generally tubular piece into said members.

CARLOS L. McMASTER.